United States Patent
Malkin et al.

(10) Patent No.: US 10,879,746 B2
(45) Date of Patent: *Dec. 29, 2020

(54) WIRELESS CHARGING DEVICE WITH MULTI-TONE DATA RECEIVER AND ACTIVE POWER SUPPLY NOISE CANCELLATION CIRCUITRY

(71) Applicant: Apple Inc., Cupertino, CA (US)

(72) Inventors: Moshe H. Malkin, Menlo Park, CA (US); Manu Agarwal, Palo Alto, CA (US); Brandon R. Garbus, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,172

(22) Filed: May 11, 2020

(65) Prior Publication Data
US 2020/0274403 A1  Aug. 27, 2020

Related U.S. Application Data

(63) Continuation of application No. PCT/US2018/062000, filed on Nov. 20, 2018, which
(Continued)

(51) Int. Cl.
*H04B 15/00* (2006.01)
*H02J 50/80* (2016.01)
(Continued)

(52) U.S. Cl.
CPC .............. *H02J 50/80* (2016.02); *H02J 7/025* (2013.01); *H02J 50/12* (2016.02); *H04B 5/0037* (2013.01); *H04B 5/0081* (2013.01)

(58) Field of Classification Search
CPC . H02J 50/80; H02J 50/12; H02J 7/025; H04B 5/0037; H04B 5/0081
(Continued)

(56) References Cited

U.S. PATENT DOCUMENTS

| 5,113,389 A | 5/1992 | Cox |
| 8,946,939 B2 | 2/2015 | Drennen |

(Continued)

FOREIGN PATENT DOCUMENTS

CN 106571692 A 4/2017

*Primary Examiner* — Tesfaldet Bocure
(74) *Attorney, Agent, or Firm* — Treyz Law Group, P.C.; Jason Tsai

(57) ABSTRACT

A wireless power transmitting device transmits wireless power signals modulated at a given power frequency to a wireless power receiving device using a wireless power transmitting coil. The wireless power receiving device may transmit data signals to the wireless power transmitting device. The wireless power transmitting device may include a data receiver that is coupled to the wireless power transmitting coil and that receives the transmitted data. The data receiver may include an input stage, bandpass filter circuitry, demodulator circuitry, and a data stream combiner. The data receiver may further include a power supply noise cancellation circuit. The power supply noise cancellation circuit may include an input stage, a baseband filter, a window filter, a down-sampler, and a difference filter. The power supply noise cancellation circuit may be coupled to the data stream combiner and is configured to mitigate power supply noise interference in the received data.

20 Claims, 8 Drawing Sheets

Related U.S. Application Data is a continuation of application No. 16/184,846, filed on Nov. 8, 2018, now Pat. No. 10,615,648.

(60) Provisional application No. 62/598,247, filed on Dec. 13, 2017.

(51) Int. Cl.
*H02J 50/12* (2016.01)
*H04B 5/00* (2006.01)
*H02J 7/02* (2016.01)
*H04B 1/10* (2006.01)

(58) Field of Classification Search
USPC ........ 375/285, 346, 268, 219, 295, 316, 377
See application file for complete search history.

(56) References Cited

U.S. PATENT DOCUMENTS

| | | |
|---|---|---|
| 9,209,627 B2 | 12/2015 | Baarman et al. |
| 9,391,469 B2 | 7/2016 | Kim et al. |
| 10,014,721 B2 | 7/2018 | Singh et al. |
| 2005/0103545 A1 | 5/2005 | Green et al. |
| 2012/0326686 A1 | 12/2012 | Dai et al. |
| 2014/0008990 A1 | 1/2014 | Yoon |
| 2014/0300202 A1 | 10/2014 | Shimokawa |
| 2014/0314170 A1 | 10/2014 | Plumb et al. |
| 2015/0069854 A1 | 3/2015 | Kim et al. |
| 2015/0115735 A1 | 4/2015 | Singh et al. |
| 2016/0336785 A1 | 11/2016 | Gao et al. |
| 2016/0336976 A1 | 11/2016 | Onishi |
| 2017/0271923 A1 | 9/2017 | Kim et al. |
| 2018/0254671 A1 | 9/2018 | Murata et al. |
| 2019/0115781 A1 | 4/2019 | Feng |
| 2019/0181697 A1 | 6/2019 | Malkin et al. |

WIRELESS CHARGING DEVICE WITH MULTI-TONE DATA RECEIVER AND ACTIVE POWER SUPPLY NOISE CANCELLATION CIRCUITRY

This application is a continuation of International Application PCT/US2018/62000, with an international filing date of Nov. 20, 2018, which claims priority to U.S. patent application Ser. No. 16/184,846, filed on Nov. 8, 2018 (now issued as U.S. Pat. No. 10,615,648 on Apr. 7, 2020), which claims the benefit of provisional patent application No. 62/598,247, filed Dec. 13, 2017, which are hereby incorporated by reference herein in their entireties.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to wireless power receiving device such as a portable electronic device. The portable electronic device receives the wirelessly transmitted power and uses this power to charge an internal battery or to power the device.

It may sometimes be desirable to transmit data from the wireless power receiving device to the wireless power transmitting device. So-called in-band communications schemes have been developed that allow wireless power receiving devices to communicate with wireless power transmitting devices. In a typical in-band communications scheme, a switching circuit that is coupled to the coil in the wireless power receiving device is used to modulate the load across the coil. The wireless power transmitting device will attempt to detect the modulated signal using a sensing circuit coupled to a coil in the wireless power transmitting device.

The sensing circuit is powered by a power supply voltage. Ideally, the power supply voltage is a fixed signal that does not vary in time. In practice, however, the power supply voltage can exhibit power supply noise variation. Depending on its frequency, it is sometimes possible for the power supply noise variation to interfere with the in-band communications between the wireless power transmitting device and the wireless power receiving device. As a result, the reliability and the signal-to-noise ratio of the communications channel linking the wireless power transmitting device and the wireless power receiving device may be degraded.

SUMMARY

A wireless power transmitting device transmits wireless power signals to a wireless power receiving device. The wireless power transmitting device has an inverter that supplies signals to an output circuit that includes a wireless power transmitting coil. The inverter may modulate the signals at a given power frequency. The wireless power transmitting coil may be part of an array of wireless power transmitting coils that cover a wireless charging surface associated with the wireless power transmitting device.

The wireless power receiving device may transmit data signals to the wireless power transmitting device for authentication purposes (as an example). The wireless power transmitting device may include a data receiver that is coupled to the wireless power transmitting coil and that receives the transmitted data signals. The data signals may be modulated at a data rate that is different than the power frequency (e.g., by dynamically adjusting the impedance at the wireless power receiving device at an arbitrary rate in relation to the power frequency).

The data receiver may include an input stage, bandpass filter circuitry, demodulation circuitry, and a data stream combiner. The input stage may include a voltage attenuator, a low-pass anti-aliasing filter for rejecting high frequency components (e.g., frequency components greater than the third harmonic or higher multiple of the power frequency), and a data converter. The bandpass filter circuitry may receive digital signals from the data converter. The bandpass filter circuitry may generate bandpass filtered signals (e.g., at least first bandpass filtered signals at the power frequency, second bandpass filtered signals at a second harmonic of the power frequency, and third bandpass filtered signals at a third harmonic of the power frequency). The demodulation circuitry may receive the bandpass filtered signals and generate corresponding demodulated data streams, which are then fed to the data stream combiner (e.g., a matched filter).

The data receiver may also include a power supply noise cancellation circuit configured to mitigate power supply noise interference in data signals received from the wireless power receiving device. The power supply noise cancellation circuit may sample the power supply voltage that powers the wireless power transmitting device and may process the sampled power supply voltage to produce a power supply noise cancellation stream. The power supply noise cancellation circuit may include an input stage, a baseband filter that receives signals from the input stage, a window filter, a down-sampling circuit, and a difference filter.

The data receiver may further include an adaptation circuit that analyzes the demodulated data streams and the power supply noise cancellation stream to generate corresponding coefficients to maximize the power when combining the different streams at the combiner (e.g., the adaptation circuit is configured to generate matching coefficients to maximize the signal-to-noise ratio at the output of the data stream combiner). After applying the matching coefficients to the demodulated data streams and the noise cancellation stream, the combiner will sum together the demodulated data streams and then substract out the noise cancellation stream to remove the undesired noise component. Operated in this way, the final output of the data receiver exhibits improved signal-to-noise ratio.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
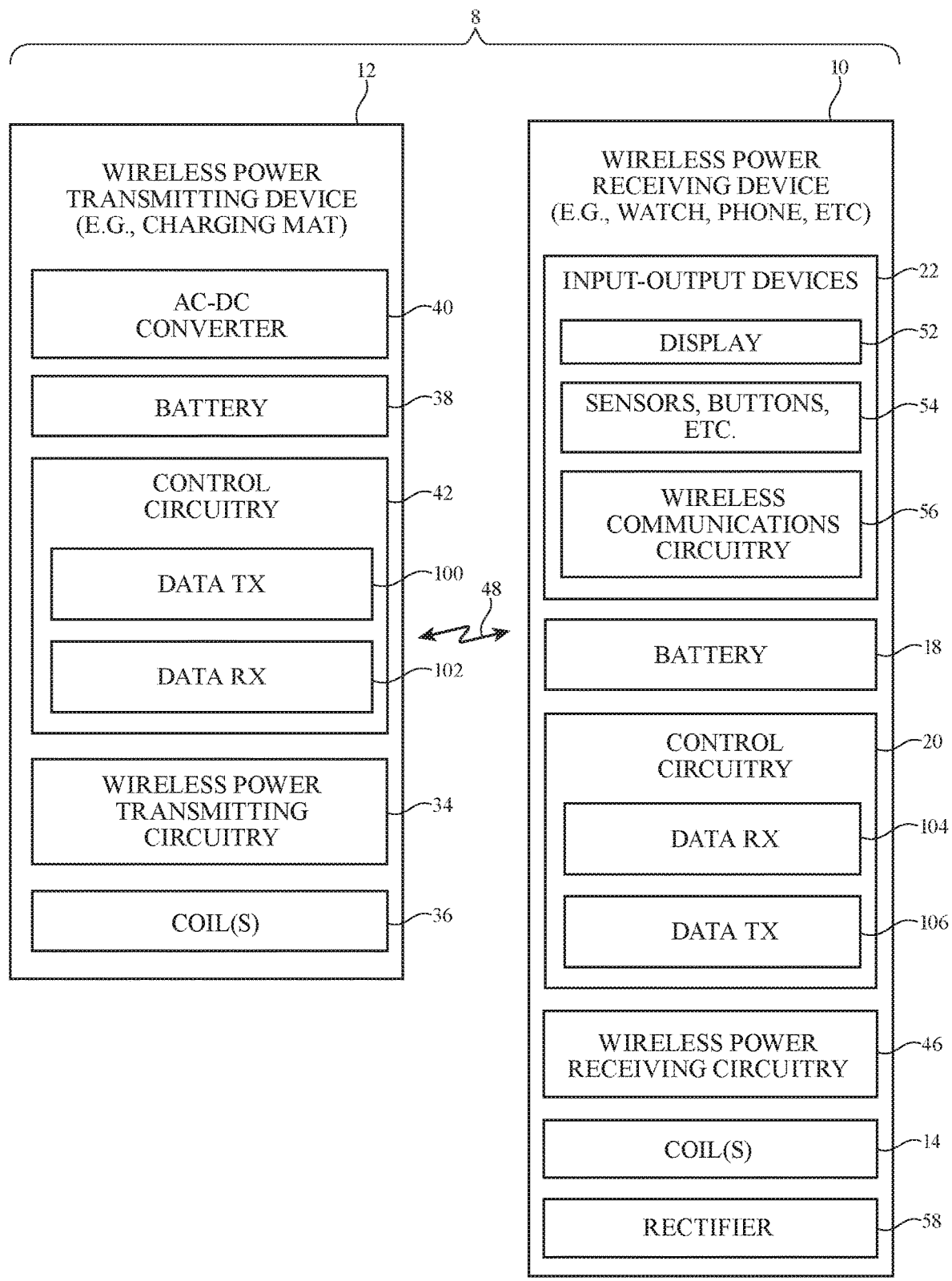
FIG. 1 is a schematic diagram of an illustrative wireless charging system in accordance with an embodiment.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations may sometimes be described herein as an example.

Devices 12 and 10 include control circuitry 42 and 20, respectively. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

During operation of system 8, a user places one or more devices 10 on the charging surface of device 12. Power transmitting device 12 is coupled to a source of alternating-current voltage such as an alternating-current power source (e.g., a wall outlet that supplies line power or other source of mains electricity), has a battery such as battery 38 for supplying power, and/or is coupled to another source of power. A power converter such as AC-DC power converter 40 can convert power from a main power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Wireless power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the inverter circuit, alternating-current electromagnetic fields (wireless power signals 48) are produced that are received by one or more corresponding coils 14 coupled to wireless power receiving circuitry 46 in receiving device 10. When the alternating-current electromagnetic fields are received by coil 14, corresponding alternating-current currents and voltages are induced in coil 14.

Rectifier circuit 58, which is sometimes considered to be part of circuitry 46, converts the received AC signals (e.g., received alternating-current currents and voltages associated with wireless power signals 48) from one or more coils 14 into DC voltage signals for powering device 10. The DC voltages are used in powering components in device 10 such as display 52, touch sensor components and other sensors 54

(e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Device 12 and/or device 10 may communicate wirelessly. Devices 10 and 12 may, for example, have wireless transceiver circuitry in control circuitry 42 and 20 (and/or wireless communications circuitry such as circuitry 56) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

When it is desired to transmit data from device 12 to device 10, data transmitter circuitry 100 in control circuitry 42 may be used in modulating the signals that are supplied to coil 36. Control circuitry 20 of power receiving device 10 may use a data receiver circuit such as data receiver 104 to demodulate the modulated signal pulses from transmitter 100. Conversely, data transmitter circuit 106 of device 10 may be used in producing signals that are transmitted by coil 14 to coil 36 of device 12 and that are demodulated by data receiver 102 in control circuitry 42 of device 12.

When it is desired to transmit data from device 10 to device 12, device 12 may optionally cease transmission of power. While device 12 is not transmitting wireless power to device 24, data transmitter circuit 106 of device 10 may modulate one or more transistors in wireless power receiving circuitry 46 or control circuitry 20, thereby creating wireless signals that are transmitted from coil 14 to coil 36 of device 12. Because data signals are conveyed wirelessly from device 10 to device 12 using coils 14 and 36, this type of data communications between device 10 and device 12 may sometimes be referred to as "in-band" communications. Device 12 may use data receiver 102 to demodulate the wireless signals from device 10 and thereby receive the data transmitted from device 10. The transmitted data may be used to authenticate device 10 to device 12, may be used to supply feedback or other control signals to device 12, or may be used to convey other information. This example in which transmission of power is temporarily suspended during data transmission is merely illustrative. If desired, wireless power transmission and data reception may occur simultaneously (without ceasing the transmission of power).

When device 12 is in power transmission mode, control circuitry 42 may use a pulse-width modulation (PWM) envelope to modulate the AC drive signals that are being supplied to output inverter transistors coupled to coil 36 and thereby adjust how much power is being supplied to device 10. The duty cycle of the PWM pulse train (pulse envelope) may be adjusted dynamically to adjust the amount of power being wirelessly transmitted from device 12 to device 10. The duty cycle of the PWM envelope may, if desired, be adjusted based on power transmission feedback information that is conveyed in-band from data transmitter 106 to data receiver 102. For example, device 12 can use information that has been transmitted back from device 10 to device 12 to increase or decrease the amount of transmitted power that device 12 is providing to device 10.

The output inverter transistors in wireless power transmitting circuitry 34 may, for example, be modulated at an AC frequency of about 130 kHz (or other suitable frequency between 100 to 400 kHz) to create an AC signal to drive coil 36. As this AC signal passes through coil 36, a corresponding wireless power signal (electromagnetic signal 48) is created and conveyed to coil 14 of device 10. This AC frequency at which power transmitting circuitry 34 is modulated is sometimes referred to as the power carrier frequency ("fp"). Data signals received at receiver 102 may be modulated at a lower frequency of 2 kHz (or other suitable frequency above or below 2 kHz).

Figure 2:
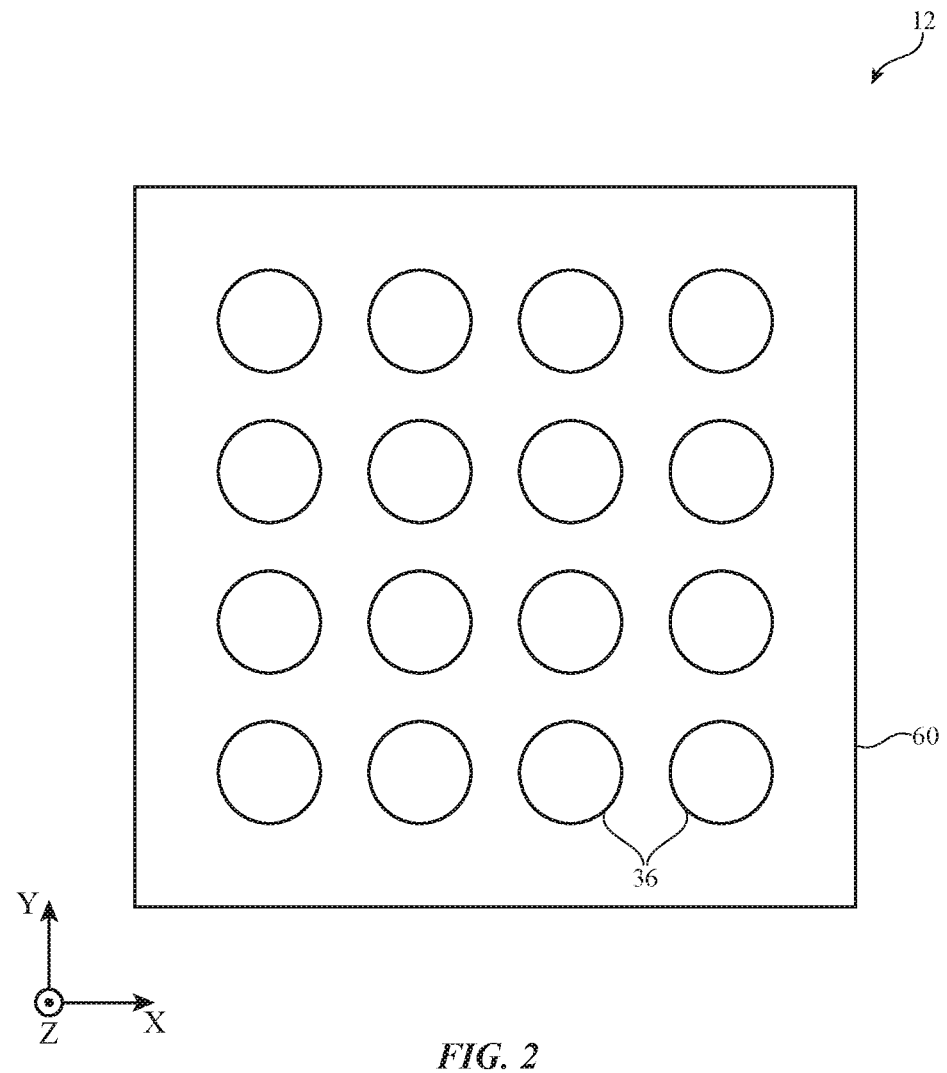
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user may place one or more devices 10 on charging surface 60. Depending on the position and the orientation at which device 10 is placed on charging surface 60, the electric coupling between coils 36 and coil(s) 14 may be different. For example, device 10 may be placed on charging surface 60 such that coil 14 only overlaps with a first portion of coils 36. In another instance, device 10 may be placed on charging surface 60 such that coil 14 overlaps with a second portion of coils 36 that is different than the first portion. As a result, data transmission between devices 10 and 12 may be affected by the exact placement of device 10 on charging surface 60. In order for device 10 to properly authenticate device 10 to device 12 in a variety of scenarios, the in-band communications between devices 10 and 12 should be properly handled regardless of how portable device 10 is being placed on charging surface 60. In accordance with an embodiment, a data receiver circuit such as data receiver circuit 102 of the type shown in FIG. 3 is provided that is capable of handling data reception in all types of operating environments.

Figure 3:
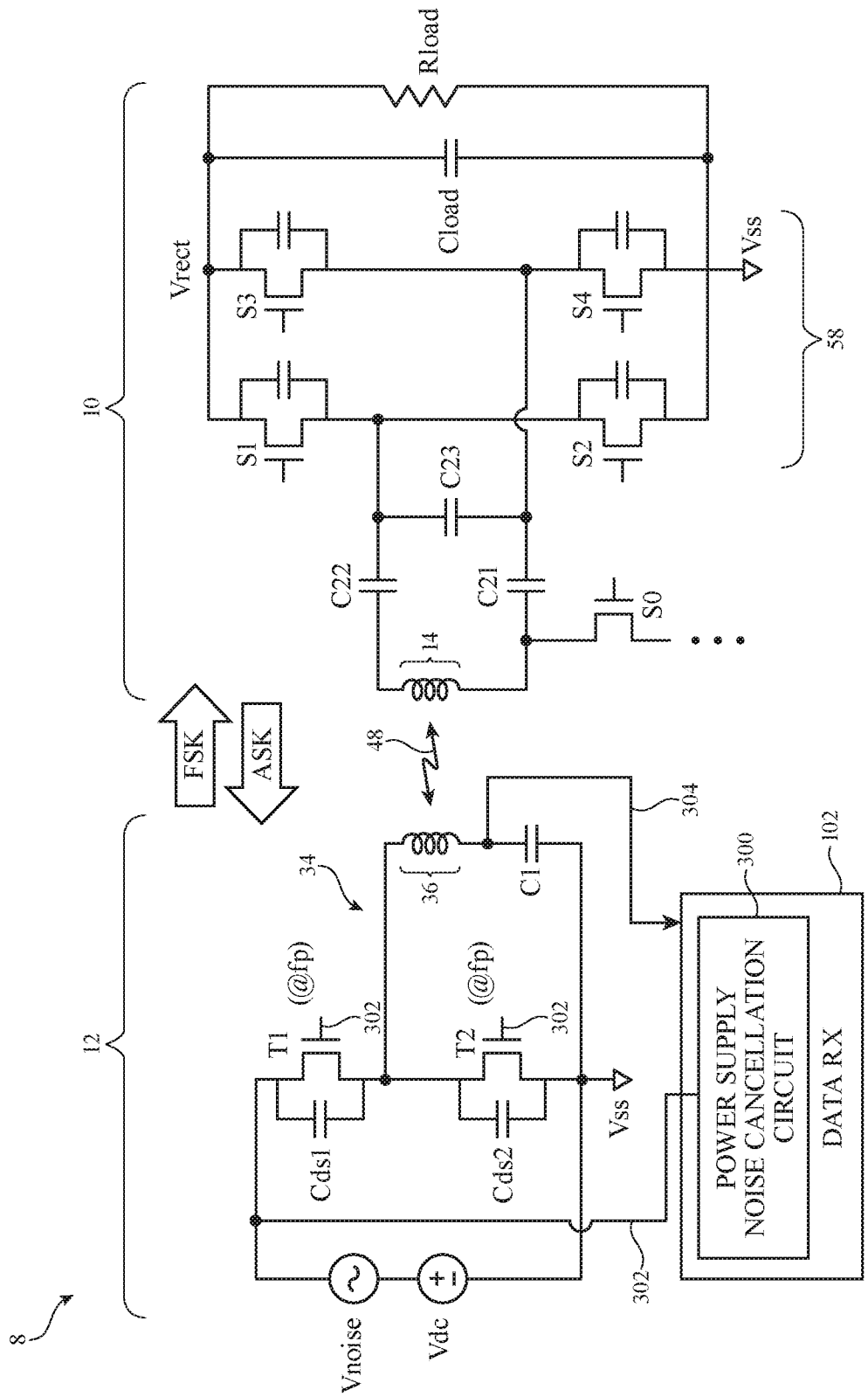
FIG. 3 is a circuit diagram of illustrative devices in a system of the type shown in FIG. 1 in accordance with an embodiment.

FIG. 3 is a circuit diagram showing illustrative circuitry that may be used for a wireless power transmitting device and wireless power receiving device in system 8. As shown in FIG. 3, wireless power transmitting device 12 may receive a DC voltage Vdc from AC-DC converter 40 (FIG. 1). Control circuitry 42 may produce control signals that are applied to gate terminals 302 of inverter transistors T1 and T2. Gates 302 of transistors T1 and T2 may receive complementary signals so that the gate of transistor T1 is high when the gate of transistor T2 is low, and vice versa. With one illustrative configuration, transistors T1 and T2 may be supplied with an AC signal at 200 kHz or other suitable frequency that is modulated with a PWM envelope at 2 kHz or other suitable PWM frequency. Other suitable control signals may be applied to T1 and T2, if desired. Transistors T1 and T2 may be characterized by an internal diode and drain-source capacitance (see, e.g., capacitances Cds1 and Cds2), as shown schematically in FIG. 2.

Transistors T1 and T2 are coupled in series between a positive voltage terminal (at power supply voltage Vdc and a ground power supply terminal (at ground voltage Vss). Coil 36 has a first terminal coupled to a node between transistors T1 and T2 and a second terminal coupled to ground via capacitor C1. As the control signals are applied to gates 302 of output transistors T1 and T2, the DC voltage Vdc is converted into an AC current that passes through capacitor C1 and coil 36. This produces corresponding wireless signal 48, which is transmitted to device 10 and received by coil 14 in device 10. In general, coil 36 in FIG. 3 may represent one or more wireless power transmitting coils in device 12, optionally arranged in an array as shown in FIG. 2. Similarly, coil 14 in FIG. 3 may represent one or more wireless power receiving coils in device 10.

The received AC signal from coil 14 is conveyed through capacitors C21 and C22 to a bridge circuit of rectifier circuit 58. Capacitor C23 may be coupled between capacitors C21 and C22. Transistors S1-S4 of rectifier 58 may be operated in a synchronous rectifier mode to rectify the received signal and thereby produce rectified DC signal (voltage) Vrect across capacitor Cload and resistance Rload. In synchronous rectifier operation, control circuitry within wireless power receiving circuitry 46 senses the voltage at the drain of each transistor and uses the sense voltage as a trigger signal to actively turn on each transistor when appropriate. Synchronous rectifier operation may enhance rectification efficiency by eliminating power loss due to diode turn-on voltages. Capacitor Cload may store rectified voltage Vrect that is generated by the bridge circuit of rectifier 58 across the output load Rload. During normal operation, a charger (not shown) can use the DC voltage Vrect to charge battery 18 and to supply power to system circuitry in device 10 (see FIG. 1).

Data may be transmitted from device 12 to device 10. For example, the PWM signal that is applied to transistors T1 and T2 may be modulated by transmitter 100 using a modulation scheme such as frequency-shift keying (FSK) or other suitable modulation scheme. Data receiver 104 may have a detector circuit configured to detect the modulated data signal from transmitter 100. Data transmission from device 12 to device 10 may take place during power transmission from device 12 to device 10.

When it is desired to transmit data from device 10 to device 12, data transmitter 106 of control circuitry 20 may modulate at least transistor S0 in accordance with the data being transmitted. As described above, device 12 may optionally cease power transmission operations during the transmission of in-band data from device 10 to device 12. In the example of FIG. 3, transistor S0 may be coupled to the node between coil 14 and capacitor C21. Transistor S0 configured in this way may serve as an impedance adjustment switch and may be coupled to other passive impedance modifying circuitry (e.g., one or more inductors, capacitors, and/or resistors coupled in series, in parallel, and some combination of the two). The example of FIG. 3 in which switch S0 is coupled to the node between inductor 14 and capacitor C21 is merely illustrative. In general, switch S0 may be coupled to capacitor C22, to capacitor C23, or any other node of device 10 shown in FIG. 3.

When switch S0 is closed (e.g., when transistor S0 is turned on), the circuitry coupled to coil 14 may exhibit a first impedance. When switch S0 is open (e.g., when transistor S0 is turned off), the circuitry coupled to coil 14 may exhibit a second impedance that is different than the first impedance. Device 10 is therefore modulating data by changing the impedance at coil 14. Device 12 may be configured to decode the corresponding data by sensing the perturbation in the waveform based on the impedance changes. In general, any suitable modulation scheme may be used to support transmission of data from device 10 to device 12. With one illustrative configuration, transmitter 106 may modulate transmitted data using a modulation scheme such as amplitude-shift keying (ASK) modulation.

Switch S0, which is sometimes considered to be part of data transmitter circuit 106, may (for example) be modulated at an AC frequency of about 2 kHz (or other suitable frequency between 1 to 10 kHz). The frequency at which data being transmitted from device 10 to device 12 is modulated is sometimes referred to as the "data rate." In the scenario in which transmitter 106 modulates transmitted signals using ASK modulation, the data rate is sometimes referred to as the ASK data modulation rate or $f_{ASK}$.

In contrast, the frequency at which inverter transistors T1 and T2 at device 12 are modulated may sometimes be referred to as the "carrier" frequency, the "power" frequency, or the power carrier frequency (fp). Output inverter transistors T1 and T2 in wireless power transmitting circuitry 34 may, for example, be modulated at a power frequency of about 120 kHz (or other suitable frequency between 100 to 400 kHz) to create an AC signal to drive coil 36. As this AC signal passes through coil 36, a corresponding wireless power signal (electromagnetic signal 48) is created and conveyed to coil 14 of device 10. In general, the data rate is independent of the power carrier frequency (e.g., frequency fp can be adjusted while data rate $f_{ASK}$ remains constant, or vice versa). Because the data signals are being transmitted in-band, the 2 kHz data signals may be modulated on top of the power carrier frequency.

Figure 4:
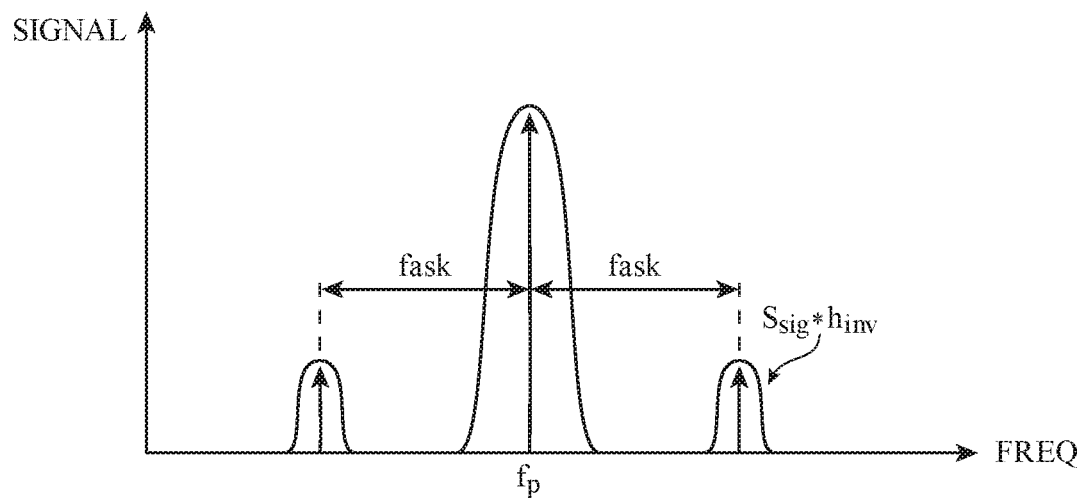
FIG. 4 is a diagram showing modulated received data signals in the frequency domain in accordance with an embodiment.

FIG. 4 is a diagram showing modulated received data signals in the frequency domain. As shown in FIG. 4, the power signal component is centered at the power carrier frequency fp, whereas the data signal component is modulated about the power carrier frequency at ($fp \pm f_{ASK}$), assuming an ASK modulation scheme at transmitter 106. The resulting modulated data signal component may be expressed mathematically as the result of the convolution of the raw data signal $s_{sig}$ with the transfer function $h_{inv}$ of the output inverter circuit of wireless power transmitting circuitry 34.

Communicating by modulating the impedance can be challenging because changing the impedance at device 10 does not necessarily translate to a detectable amplitude change at device 12 (e.g., in the case of ASK modulation at data transmitter 106). A data receiver that only monitors the received data at power carrier frequency fp may be incapable of discerning any meaningful amplitude or phase shift in response to the ASK modulation at data transmitter 106.

In accordance with an embodiment, a more robust data receiver such as data receiver 102 is provided that is capable of properly decoding data conveyed via impedance adjustments. Still referring to FIG. 3, data receiver 102 may be coupled to the node between coil 36 and capacitor C1. This arrangement is merely illustrative. In general, data receiver 102 may be coupled to the node between transistors T1 and T2, or any other suitable node within device 12.

Figure 6:
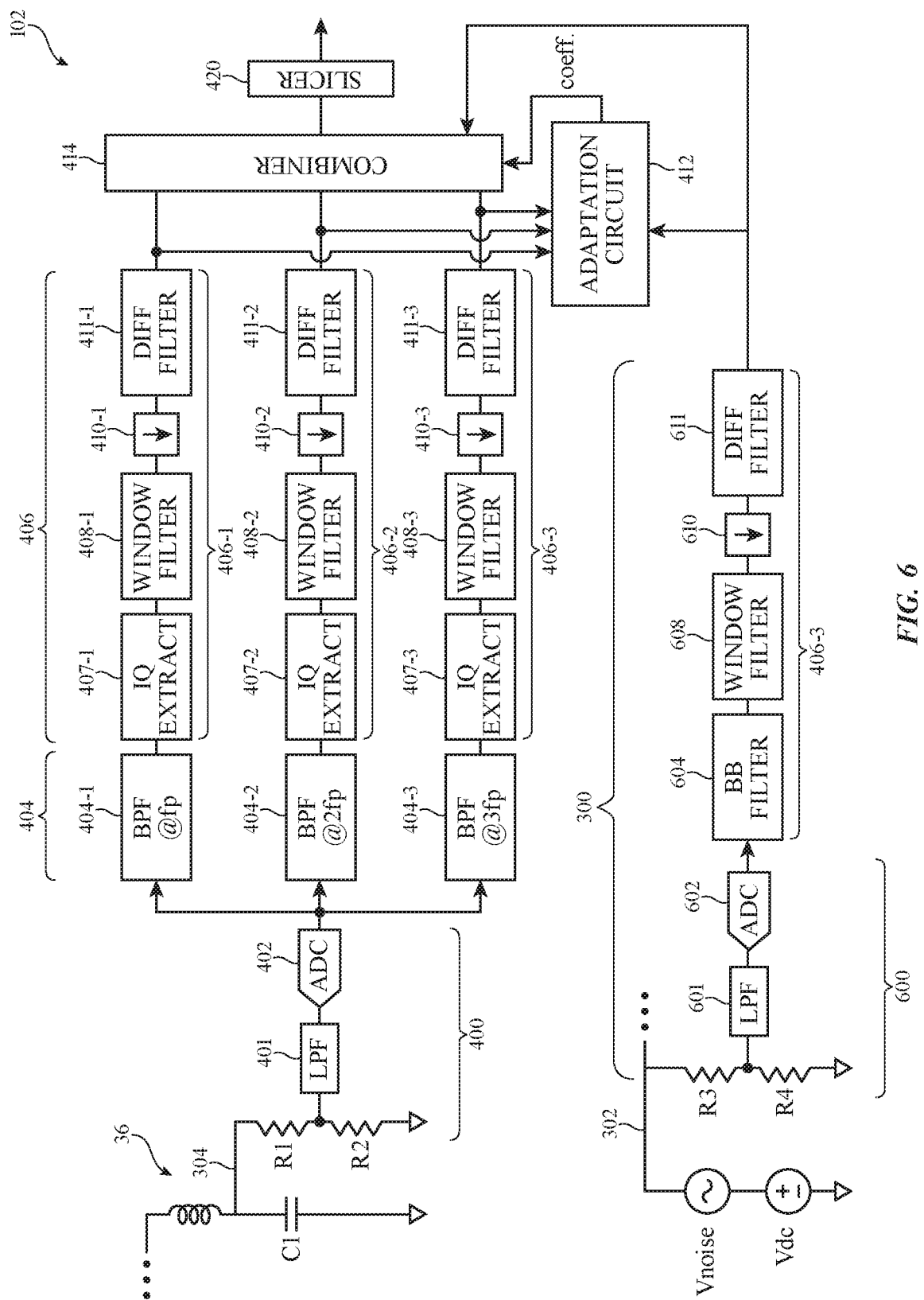
FIG. 6 is a diagram of an illustrative data receiver within a wireless power transmitting device, where the data receiver includes a power supply noise cancellation circuit in accordance with an embodiment.

FIG. 6 shows one suitable circuit implementation of data receiver 102. As shown in FIG. 6, data receiver 102 may include an input stage 400, bandpass filter circuitry 404 that receives signals from input stage 400 and generates corresponding bandpass filtered signals, demodulator circuitry 406 that receives the bandpass filtered signals from circuitry 404 and generates corresponding multiple demodulated data streams, and a data stream combiner 414 that receives and combines the multiple demodulated data streams from circuitry 406 to provide a final data output. Input stage 400 may include an attenuator formed using a resistor divider having resistors R1 and R2, low-pass filter circuit 401 that receives signals from the attenuator, and analog-to-digital converter 402 that receives signals from low-pass filter 401. The example of FIG. 6 in which the attenuator is coupled to the node between coil 36 and capacitor C1 via path 304 is merely illustrative. In general, the attenuator in stage 400 may be coupled to any other node of wireless power transmitter circuitry 34 (FIG. 1).

Low-pass filter 401 may be an analog filter circuit. As described above, signals may be modulated at an AC frequency (sometimes referred to herein as the power carrier frequency fp) of at least 100 kHz at wireless power transmitter circuitry 34. Analog low-pass filter 401 may be configured to filter out undesired high frequency components received from the attenuator. For example, filter 401 may be configured to pass through low frequency components such as signal components at power frequency fp, signal components at two times fp, and signal components at three times fp and to filter out signals having frequencies greater than 3*fp. In this context, power frequency fp can be referred to as the "fundamental frequency" while frequency 2*fp (i.e., a first integer multiple of the fundamental frequency) can be referred to as the "second harmonic" frequency and while frequency 3*fp (i.e., a second integer multiple of the fundamental frequency) can be referred to as the "third harmonic" frequency, and so on. In general, the analog filtering is configured to reject signals not needed for detection, but that might interfere with the demodulation either through linear coupling and/or aliasing and/or form non-linearity that could cause the circuitry, which could distort the desires signals. This is merely illustrative. If desired, filter 401 may be configured to pass through signal components up to only the second harmonic frequency, to pass through signal components up to the fourth harmonic frequency or greater than the fourth harmonic frequency, etc.

Data converter 402 may receive low-pass filtered signals from filter 401 and may convert the received analog signals into digital signals. In particular, data converter 402 may output digital signals at a given sampling rate. As an example, A/D converter 402 may be configured to output signals at 2 Msps (mega-samples per second). In this example, filter 401 may be operated to ensure interference above the 1 MHz are sufficiently rejected at the ADC input. Configured in this way, low-pass filter 401 may serve as an anti-aliasing filter for data converter 402.

Bandpass filter circuitry 404 may receive the converted sampled signals from data converter 402. In the example of FIG. 6, bandpass filter circuitry 404 may include a first bandpass filter circuit 404-1 configured to selectively pass signals at fundamental frequency fp and to generate corresponding first bandpass filtered signals, a second bandpass filter circuit 404-2 configured to selectively pass signals at second harmonic frequency 2*fp and to generate corresponding second bandpass filtered signals, and a third bandpass filter circuit 404-3 configured to selectively pass signals at third harmonic frequency 3*fp and to generate corresponding third bandpass filtered signals. In general, the digital signal at the output of the ADC could be filtered to further reduce noise and undesired components.

If desired, additional bandpass filter circuits at higher harmonic frequencies may also be included. Adding more bandpass filters may yield improved accuracy (albeit at diminish returns since the power levels at higher order harmonics are reduced) at the cost of increased circuit area and power consumption. In general, bandpass filter circuitry 404 may include at least two bandpass filter circuits or more than three bandpass filter circuits configured to selectively pass signal components at any number of desired frequencies. Separating the received signal into different frequency streams (e.g. into the fundamental frequency stream and associated harmonic frequency streams) may be advantageous since amplitude and/or frequency changes at each frequency component are easier to detect than when looking at a single data stream that lumps together all the different frequency components.

The bandpass filtered signal streams may then be fed to demodulator circuitry 406. As shown in FIG. 6, demodulator circuitry 406 may include a first demodulator circuit 406-1 that receives the first bandpass filtered signals from circuit 404-1, a second demodulator circuit 406-2 that receives the second bandpass filtered signals from circuit 404-2, and a third demodulator circuit 406-3 that receives the third bandpass filtered signals from circuit 404-3. First demodulator circuit 406-1 may include extraction circuit 407-1, window filter circuit 408-1, down-sampling circuit 410-1, and difference filter circuit 411-1.

Extraction circuit 407-1 may be configured to extract in-phase (I) and quadrature (Q) signal components from the first bandpass filtered signals. Extraction circuit 407-1 may therefore sometimes be referred to as an IQ extractor. Extraction circuit 407-1 may, for example, be configured to implement the Goertzel algorithm at the fundamental power frequency fp (e.g., circuit 407-1 may multiply the first bandpass filtered signals by a local oscillator frequency to isolate the desired phase and amplitude components). Other possible implementations include down-conversion using a lookup table to generate sinusoidal components or a CORDIC engine to generate sinusoids to be used for down-conversion.

Window filter 408-1 may receive the IQ signals from extraction circuit 407-1 and may be configured to accumulate the received signals and to generate a corresponding moving average by oversampling the received signals. Filter 408-1 may output oversampled signals to down-sampling circuit 410-1. Down-sampling circuit 410-1 may be configured to down-sample the received signals. Circuit 410-1 may then output the down-sampled signals to difference filter 411-1. Difference filter 411-1 may be configured to remove any DC bias from the down-sampled signals to generate a first demodulated data stream, which is provided to data stream combiner 414.

Similarly, second demodulator circuit 406-2 may include extraction circuit 407-2, window filter circuit 408-2, down-sampling circuit 410-2, and difference filter circuit 411-2. Extraction circuit 407-1 may be configured to extract IQ signal components from the second bandpass filtered signals. Extraction circuit 407-2 may, for example, be configured to implement the Goertzel algorithm at the second harmonic frequency 2*fp.

Window filter 408-2 may receive the IQ signals from extraction circuit 407-2 and may be configured to accumulate the received signals and to generate a corresponding moving average by oversampling the received signals. Filter 408-2 may output the oversampled signals to down-sampling circuit 410-2. Down-sampling circuit 410-2 may be configured to down-sample the received signals. Circuit 410-1 may then output the down-sampled signals to difference filter 411-2. Difference filter 411-2 may be configured to remove any DC bias from the down-sampled signals to generate a second demodulated data stream, which is provided to data stream combiner 414.

Similarly, third demodulator circuit 406-3 may include extraction circuit 407-3, window filter circuit 408-3, down-sampling circuit 410-3, and difference filter circuit 411-3. Extraction circuit 407-3 may be configured to extract IQ signal components from the third bandpass filtered signals.

Extraction circuit 407-3 may, for example, be configured to implement the Goertzel algorithm at the third harmonic frequency 3*fp.

Window filter 408-3 may receive the IQ signals from extraction circuit 407-3 and may be configured to accumulate the received signals and to generate a corresponding moving average by oversampling the received signals. Filter 408-3 may output oversampled signals to down-sampling circuit 410-3. Down-sampling circuit 410-3 may be configured to down-sample the received signals. Circuit 410-3 may then output the down-sampled signals to difference filter 411-3. Difference filter 411-3 may be configured to remove any DC bias from the down-sampled signals to generate a third demodulated data stream, which is provided to data stream combiner 414.

The example above in which extraction circuits 407-1, 407-2, and 407-3 implement the Goertzel algorithm is merely illustrative. In general, extraction circuits 407 may be implemented using any suitable demodulation scheme to extract desired phase and amplitude information from the bandpass filtered signals. If desired, windowing circuits 408 may be configured to implement a weighted accumulation scheme to achieved enhanced interference rejection.

Referring still to FIG. 6, data stream combiner 414 may be configured to align the multiple data streams received from demodulator circuitry 406. Data receiver 102 may also include an adaptation circuit such as adaptation circuit 412 (which is sometimes considered to be a part of data stream combiner 414) that monitors the signals at the output of difference filter circuits 411. For example, adaptation circuit 412 may look for preamble bits in each of the data streams to help recover bit boundaries and to generate corresponding weights by matching the maximum energy with a known preamble (e.g., circuit 412 may determine the relative correlation among the different streams and to generate corresponding weights or matching coefficients that help improve or maximize the power or signal-to-noise ratio among the multiple data streams). Adaptation circuit 412 may perform matching using a least mean squares (LMS) algorithm, a least squares approach, or other stochastic methods for minimizing the amount of error between the different signal streams.

Weights or coefficients generated by adaptation circuit 412 may then be fed back into combiner 414 to help align or match the different data streams. For example, circuit 416 may apply a first set of weights to the first IQ data stream, a second set of weights to the second IQ data stream, and third set of weights to the third IQ data stream. For example, these weighting factors may help phase-align the different data streams to help minimize destructive interference. Combiner 414, in conjunction with recovery circuit 412, configured in this way to align and maximize the correlation between the multiple data streams is sometimes referred to as a matched filter.

The aligned or "matched" data streams may sometimes be referred to as correlated data streams and can be combine using a summing circuit to provide a final data output. Circuit 420 may receive the final data output from combiner 414. In general, circuit 420 may be any type of slicer, such as an equalizer, timing recovery circuit, carrier recovery circuit, zero-crossing detection circuit, or other types of data output circuitry. The final data output generated in this way may exhibit detectable perturbations caused by the impedance modulation at data transmitter 106 (FIG. 1). For example, data receiver 102 may analyze the final combined output of combiner 414 and will be able to decode a meaningful data stream corresponding to the data stream transmitted by data transmitter 106.

The summing circuit is one illustration. In general, the combined streams are sent to the next stage in processing, where data decoding of a single streams takes place, and where many possible detection schemes could be used such as equalizing, performing timing and carrier recovery, zero-crossing detectors, transition detectors, etc.

Additionally, combiner 414 may perform further processing such as filtering each stream with a filter meant to improve the signal quality and/or reject an interference coupled to the information streams. For example, the combiner could combine streams to improve the detection or to combine the streams such that an interfering signal present in the streams is reduced to improved data detection. Additionally, combiner 414 might be a more general combiner where each stream is filtered and processed with a multi-tap filter meant to shape the stream so when combined with the other streams, improved detection sensitivity or distortion suppression can be achieved.

Referring back to FIG. 3, another source of interference that can negatively impact the performance of data receiver 102 is the power supply noise variation at device 12. The power supply noise, which is a time-varying component, may be represented as a AC perturbation Vnoise on top of fixed power supply voltage Vdc. For example, in a scenario in which Vdc is set to 20 V, Vnoise may exhibit a perturbation of 50 mV, 100 mV, 200 mV, etc. Since Vnoise powers the inverter output circuit, the corresponding modulated noise signal will show up at coil 36. In general, the frequency of Vnoise is independent of the power carrier frequency, and Vnoise may also be modulated on top of the power carrier frequency.

Figure 5:
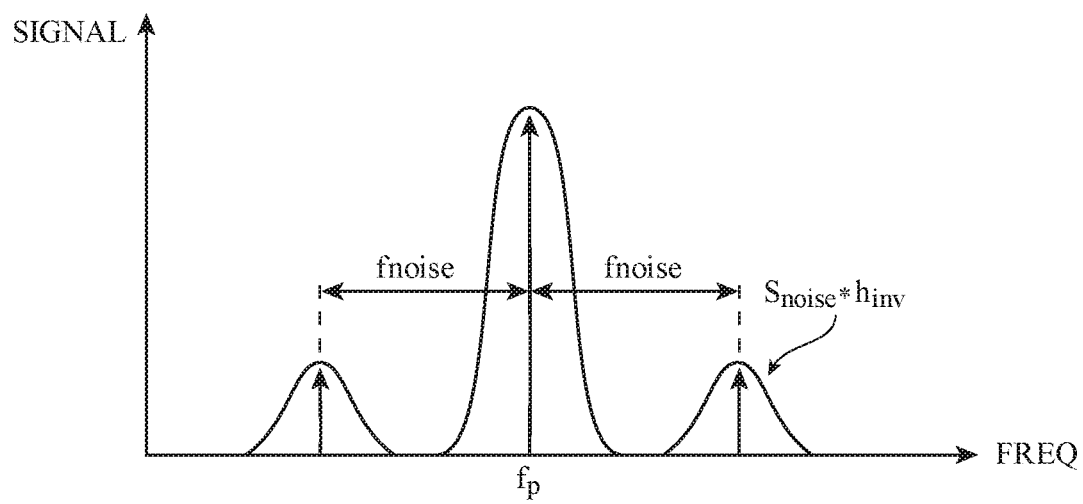
FIG. 5 is a diagram showing modulated power supply noise signals that can interfere with the received data signals.

FIG. 5 is a diagram showing modulated power supply noise signals in the frequency domain. As shown in FIG. 5, the power signal component is centered at the power carrier frequency fp, whereas the noise signal component is modulated about the power carrier frequency at (fp±fnoise), where fnoise is the frequency at which Vnoise ripples. The resulting modulated noise signal component may be expressed mathematically as the result of the convolution of the raw noise signal $s_{noise}$ with the transfer function $h_{inv}$ of the output inverter output circuit of wireless power transmitting circuitry 34.

Comparing FIGS. 4 and 5, it can be shown that the modulated noise component may interfere with the modulated data signal component when fnoise is sufficiently close to the data rate frequency (e.g., when fnoise is substantially close to $f_{ASK}$). As an example, there may be interference if fnoise is within 1 kHz of $f_{ASK}$, within 5 kHz of $f_{ASK}$, within 10 kHz of $f_{ASK}$, or within 20 kHz of $f_{ASK}$ (e.g., interference may be problematic if fnoise=$f_{ASK}$±1 kHz, if fnoise=$f_{ASK}$±5 kHz, if fnoise=$f_{ASK}$±10 kHz, if fnoise=$f_{ASK}$±20 kHz etc.). Interference may be exacerbated as the magnitude of Vnoise increases as a percentage of Vdc.

To help mitigate power supply noise interference at data receiver 102, data receiver 102 may be provided with a power supply noise cancellation circuit such as circuit 300 (see, e.g., FIGS. 3 and 6). As shown in FIG. 3, power supply noise cancellation circuit 302 may be coupled to the power supply line of device 12 via detection path 302. Power supply noise cancellation circuit 300 may be configured to isolate the variable noise component from the power supply line. The resulting isolated noise component may then be fed to adaptation circuit 412 so that the noise component can be removed from the overall combined data stream at the output of combiner 414.

FIG. 6 shows one suitable implementation of power supply noise cancellation circuit 300. As shown in FIG. 6, noise cancellation circuit 300 may include an input stage 600, a baseband filter circuit 604 that receives signals from input stage 600 and generates corresponding baseband filtered signals, a window filter circuit 608, a down-sampling circuit 610, and a difference filter circuit 611. Note that the structure of noise cancellation circuit 300 is similar to the structure of the normal receive path described above, but circuit 300 has baseband filter 604 instead of bandpass filter circuitry 404 and circuit 300 also lacks an IQ extraction circuit for demodulation. In general, it may be desirable for power supply noise cancellation circuit 300 to mimic the structure of the normal receive path to help maximize alignment/correlation at the noise cancellation stage.

Input stage 600 may include an attenuator formed using a resistor divider having resistors R3 and R4, low-pass filter circuit 601 that receives signals from the attenuator, and analog-to-digital converter 602 that receives signals from low-pass filter 601. Resistors R3 and R4 may be identical to or different than resistors R1 and R2 of input stage 400. Low-pass filter 601 may be an analog filter circuit. In one suitable arrangement, low-pass filter 401 is configured as an anti-aliasing filter for data converter 602. Data converter 602 may receive low-pass filtered signals from filter 601 and may convert the received analog signals into digital signals at a given sampling rate.

Since noise cancellation circuit 300 senses the power supply noise directly from the power supply line via path 302, baseband filter 604 is sufficient to isolate the noise component (e.g., no harmonic bandpass filtering is needed in circuit 300). Baseband filter 604 may have a cutoff frequency that is at least equal to fnoise. Window filter 608 may receive the baseband filtered signals from filter 604 and may be configured to accumulate the received signals and to generate a corresponding moving average by oversampling the received signals. Filter 608 may output oversampled signals to down-sampling circuit 610. Down-sampling circuit 610 may be configured to down-sample the received signals. Circuit 610 may then output the down-sampled signals to difference filter 611. Difference filter 611 may be configured to remove any DC bias (e.g., Vdc) from the down-sampled signals to generate a noise cancellation stream, which is provided to adaptation circuit 412 and data stream combiner 414.

Configured in this way, adaptation circuit 412 may further be configured to compare the noise cancellation stream to the other data streams received from filters 411. For example, adaptation circuit 412 may try to correlate the noise cancellation stream with the other three signal data streams to maximize the overall power or signal-to-noise ratio among the different streams. Adaptation circuit 412 may then generate corresponding weights or coefficients for realizing the maximal power alignment among the different streams. In particular, combiner 414 may scale each received data stream by the respective weight/coefficient, sum up the three demodulated data streams, and subtract out the noise cancellation stream. By subtracting the scaled noise cancellation stream from the demodulated data streams, the resulting final output signal may exhibit reduced power supply noise interference, which is a technical improvement to the design of data receiver 102.

Figure 7:
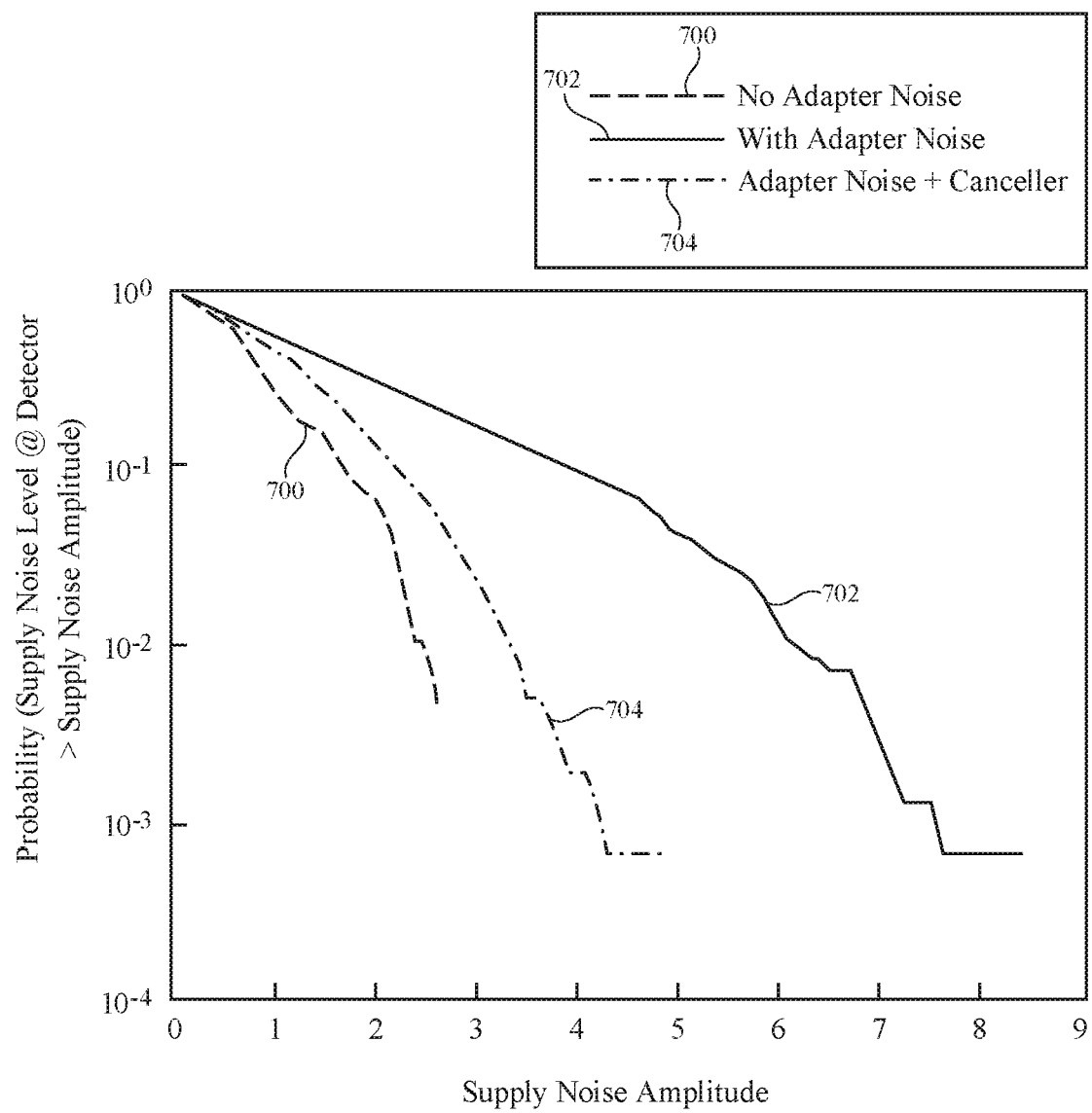
FIG. 7 is a plot illustrating how a data receiver that includes a power supply noise cancellation circuit exhibits improved communications performance in accordance with an embodiment.

FIG. 7 is a plot illustrating how data receiver 102 of the type shown in FIG. 6 may exhibit improved communications performance. In particular, FIG. 7 plots the probability that the supply noise level at the detector circuit in receiver 104 versus the supply noise amplitude in different operating scenarios. Curve 700 represents a first probability profile if there is no power supply noise (i.e., Vnoise is zero). Curve 702 represents a second probability profile if power supply noise is present and if there is no power supply noise cancellation circuit 300. Curve 704 represents a third probability profile if there power supply noise is present and if power supply noise cancellation circuit 300 is in use. As shown in FIG. 7, curve 704 with noise cancellation circuit 300 active is much closer to ideal curve 700, whereas curve 702 without noise cancellation circuit 300 suffers from a pronounced deviation from ideal curve 700. In other words, power supply noise cancellation circuit 300 can effectively mitigate power supply noise interference.

Figure 8:
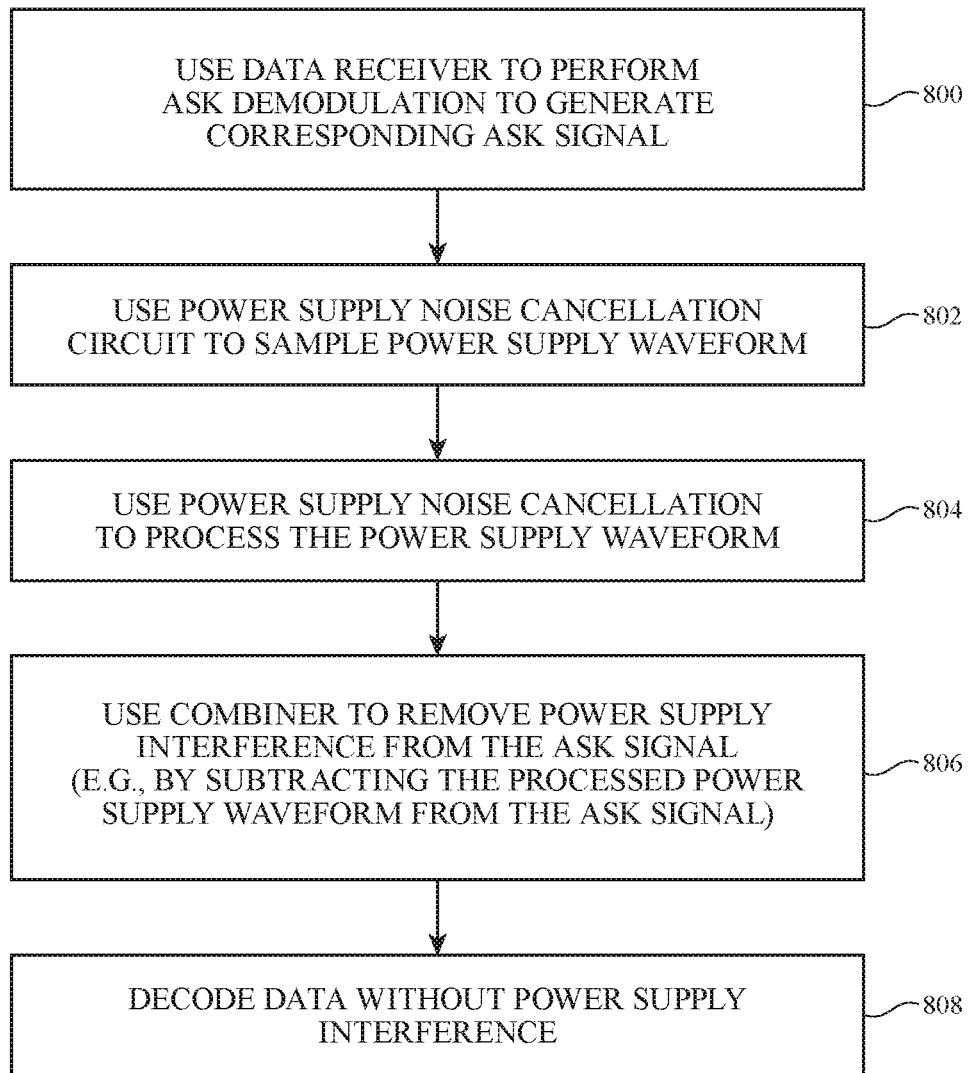
FIG. 8 is a flow chart of illustrative steps for cancelling power supply noise interference along with concurrently received data signal in accordance with an embodiment.

FIG. 8 is a flow chart of illustrative steps for cancelling power supply noise interference along with concurrently received data signal. At step 800, data receiver 102 may be configured to perform ASK demodulation to generate corresponding ASK signals (e.g., by splitting the as received signals into at least three data streams and generating three corresponding demodulated data streams).

At step 802, power supply noise cancellation circuit 300 may be configured to sample the power supply noise waveform (e.g., circuit 300 may receive the power supply voltage, which includes a superposition of Vdc and Vnoise via path 302). At step 804, power supply noise cancellation circuit 300 may be configured to process the power supply noise waveform (e.g., by passing the received power supply voltage through circuits 600, 604, 608, 610, and 611). In general, steps 802 and 804 may be performed at least partially concurrently or in parallel with step 800. In other words, the bandpass filter circuitry and the demodulator circuitry in the normal receive path are active while the power supply noise cancellation circuit is generating the noise cancellation stream.

At step 806, combiner 414 may remove the power supply noise interference from the ASK signal (e.g., by subtracting the processed power supply waveform from the ASK signal). In particular, adaptation circuit 412 may analyze the various waveforms received at the input of combiner 414 and generate coefficients to maximize the power matching among the different waveforms. The coefficients are applied to the different signal streams prior to combination to optimize the ASK signal reconstruction and power supply noise cancellation.

At step 808, the noise-cancelled data stream can be decoded and fed to slicer 420 for further processing.

Figure 9:
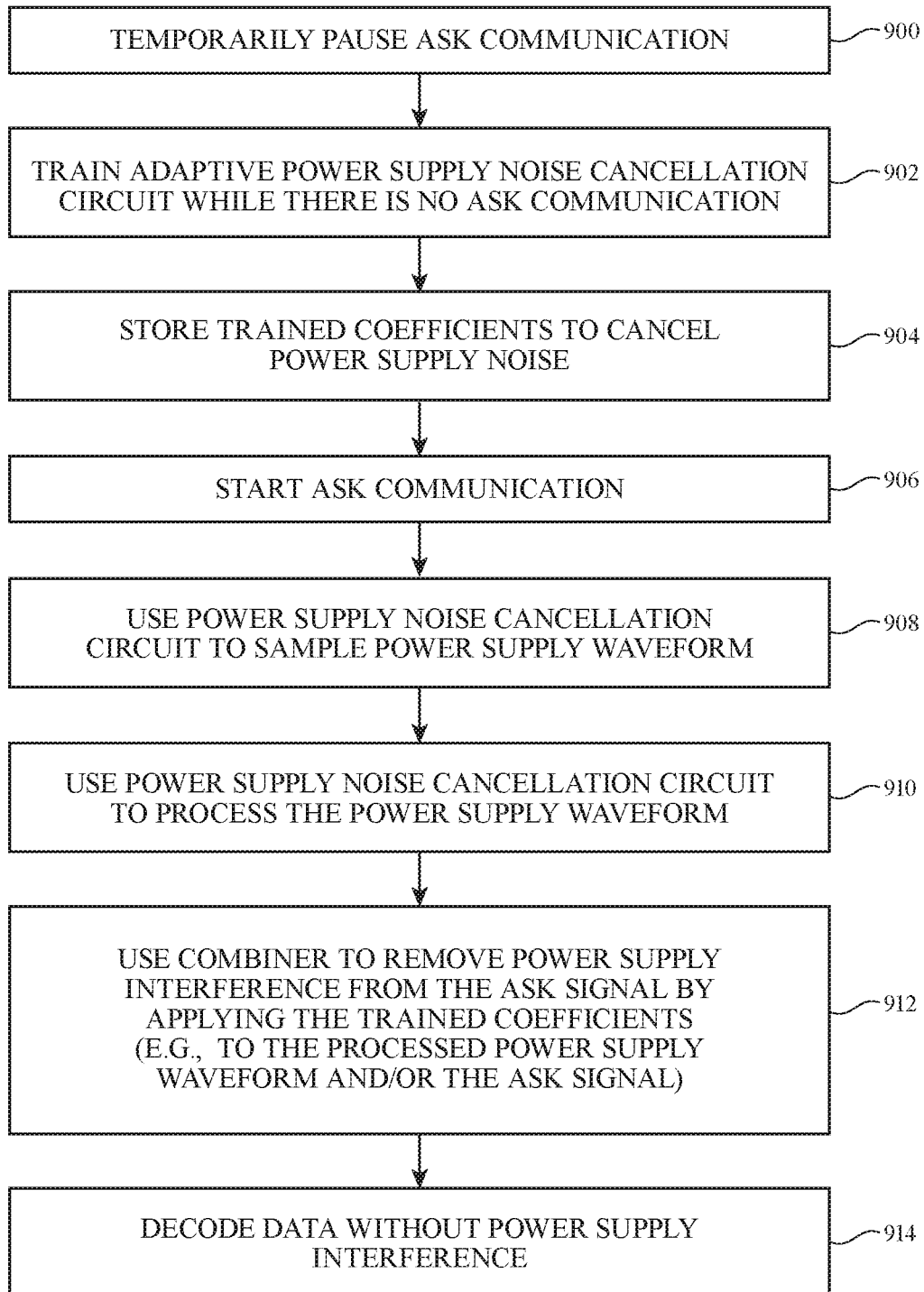
FIG. 9 is a flow chart of illustrative steps for cancelling power supply noise interference by training the power supply noise cancellation circuit while data signals are not concurrently received in accordance with an embodiment.

FIG. 9 shows another suitable method for cancelling power supply noise interference by training the power supply noise cancellation circuit while data signals are not concurrently received. At step 900, ASK communication may be temporarily paused (e.g., transmitter 106 may be temporarily idle). At step 902, data receiver 102 may be configured to "train" power supply noise cancellation circuit 300 while there is no ASK communication. In other words, the bandpass filter circuitry and the demodulator circuitry in the normal receive path are inactive during the training phase.

During this training phase, circuit 300 may receive signals from path 302, pass the received signals through circuits 600, 604, 608, 610, and 611, and output the corresponding processed power supply noise signal to adaptation circuit 412. At step 904, adaptation circuit 412 will analyze the received power supply noise waveform and store a trained coefficient to help later cancel the power supply noise.

At step 906, ASK communication may be activated (e.g., transmitter 106 may be switched back into use). At step 908, power supply noise cancellation circuit 300 may be configured to sample the power supply noise waveform via path 302. At step 910, power supply noise cancellation circuit 300 may be configured to process the power supply noise waveform (e.g., by passing the received power supply voltage through circuits 600, 604, 608, 610, and 611). During steps 908 and 910, ASK signals may also be processed by data receiver 102.

At step 912, combiner 414 may remove the power supply noise interference from the ASK signal by applying the stored trained coefficients. In particular, the trained coefficients may be applied to the power supply waveform or the ASK signal to help cancel out any power supply noise interference.

At step 914, the noise-cancelled data stream can be decoded and fed to slicer 420 for further processing.

The processes of FIGS. 8 and 9 are merely illustrative and are not intended to limit the present embodiments. If desired, the order of the steps can be changed, some steps may be performed simultaneously with another, and some steps can be omitted. If desired, other ways of performing power supply noise cancellation can also be implemented.

The foregoing is merely illustrative and various modifications can be made to the described embodiments. The foregoing embodiments may be implemented individually or in any combination.

What is claimed is:

1. A wireless power transmitting device operable with a wireless power receiving device that has a wireless power receiving coil modulated to transmit data to the wireless power transmitting device, the wireless power transmitting device comprising:
a wireless power transmitting coil;
wireless power transmitting circuitry coupled to the wireless power transmitting coil and configured to transmit wireless power signals with the wireless power transmitting coil; and
a data receiver coupled to the wireless power transmitting coil, wherein the data receiver comprises:
bandpass filter circuitry configured to receive signals from the wireless power transmitting coil and to generate corresponding bandpass filtered signals;
demodulator circuitry configured to receive the bandpass filtered signals and to produce demodulated data streams;
a power supply noise cancellation circuit configured to receive a voltage signal from the wireless power transmitting circuitry and to generate a corresponding power supply noise cancellation stream; and
a data stream combiner configured to match the power of the demodulated data streams and the power supply noise cancellation stream and to mitigate power supply noise interference by subtracting the power supply noise cancellation stream from the demodulated data streams.

2. The wireless power transmitting device of claim 1, wherein the bandpass filter circuitry comprises:
a first bandpass filter circuit configured to receive the signals from the wireless power transmitting coil, to selectively pass the received signals at a first frequency, and to generate corresponding first bandpass filtered signals of the bandpass filtered signals; and
a second bandpass filter circuit configured to receive the signals from the wireless power transmitting coil, to selectively pass the received signals at a second frequency that is different than the first frequency, and to generate corresponding second bandpass filtered signals of the bandpass filtered signals.

3. The wireless power transmitting device of claim 2, wherein the demodulator circuitry comprises:
a first demodulator circuit configured to receive the first bandpass filtered signals and to produce a first demodulated data stream of the demodulated data streams; and
a second demodulator circuit configured to receive the second bandpass filtered signals and to produce a second demodulated data stream of the demodulated data streams.

4. The wireless power transmitting device of claim 3, wherein:
the bandpass filter circuitry further comprises a third bandpass filter circuit configured to receive the signals from the wireless power transmitting coil, to selectively pass the received signals at a third frequency that is different than the first and second frequencies, and to generate corresponding third bandpass filtered signals of the bandpass filtered signals; and
the demodulator circuitry further comprises a third demodulator circuit configured to receive the third bandpass filtered signals and to produce a third demodulated data stream of the demodulated data streams.

5. The wireless power transmitting device of claim 4, wherein the second frequency is a first integer multiple of the first frequency, and wherein the third frequency is a second integer multiple of the first frequency.

6. The wireless power transmitting device of claim 1, wherein the power supply noise cancellation circuit comprises an input stage that includes an attenuator circuit, an anti-aliasing filter, and an analog-to-digital converter.

7. The wireless power transmitting device of claim 6, wherein the power supply noise cancellation circuit further comprises a baseband filter configured to receive signals from the input stage.

8. The wireless power transmitting device of claim 7, wherein the power supply noise cancellation circuit further comprises:
a window filter configured to receive signals from the baseband filter; and
a down-sampling circuit configured to receive signals from the window filter.

9. The wireless power transmitting device of claim 8, wherein the power supply noise cancellation circuit further comprises a difference filter configured to remove a direct current (DC) bias from signals received from the down-sampling circuit, and wherein the difference filter is configured to output the power supply noise cancellation stream.

10. The wireless power transmitting device of claim 9, wherein the data receiver further comprises an adaptation circuit configured to analyze the demodulated data streams and the power supply noise cancellation stream and to generate corresponding matching coefficients that controls how the data stream combiner combines the demodulated data streams and the power supply noise cancellation stream.

11. A method of operating a wireless power transmitting device operable with a wireless power receiving device that has a wireless power receiving coil modulated to transmit data to the wireless power transmitting device, the method comprising:
with wireless power transmitting circuitry in the wireless power transmitting device, transmitting wireless power signals to the wireless power receiving device; and
with a data receiver in the wireless power transmitting device, receiving the data transmitted from the wireless power receiving device, wherein receiving the data transmitted from the wireless power receiving device at the data receiver comprises:
- with bandpass filter circuitry in the data receiver, receiving the transmitted data from the wireless power receiving device and generating corresponding bandpass filtered signals;
- with demodulator circuitry in the data receiver, receiving the bandpass filtered signals and generating corresponding demodulated data streams;
- with a power supply noise cancellation circuit, receiving a voltage signal from the wireless power transmitting circuitry and generating a corresponding power supply noise cancellation stream; and
- with a data stream combiner, using the power supply noise cancellation stream to remove power supply noise interference from the demodulated data streams.

12. The method of claim 11, wherein generating the demodulated data streams comprises using the demodulator circuitry to perform amplitude-shift keying (ASK) demodulation.

13. The method of claim 11, wherein the demodulator circuitry is actively demodulating the transmitted data while the power supply noise cancellation circuit is generating the power supply noise cancellation stream.

14. The method of claim 11, wherein the demodulator circuitry is inactive while the power supply noise cancellation circuit is generating the power supply noise cancellation stream.

15. The method of claim 14, further comprising:
- temporarily pausing the transmission of data from the wireless power receiving device; and
- training the power supply noise cancellation circuit while the transmission of data is paused, wherein training the power supply noise cancellation circuit comprises using an adaptation circuit in the data receiver to analyze the power supply noise cancellation stream, to generate trained coefficients for cancelling the power supply noise interference, and to store the trained coefficients.

16. An apparatus, comprising:
- a coil;
- wireless power transmitting circuitry coupled to the coil and configured to transmit wireless power signals with the coil; and
- a data receiver coupled to the coil, wherein the data receiver comprises:
  - demodulator circuitry that receives bandpass filtered signals, extracts in-phase and quadrature components from the received bandpass filtered signals, and generates corresponding demodulated data streams;
  - a power supply noise cancellation circuit that samples a voltage signal from the wireless power transmitting circuitry and generates a corresponding power supply noise cancellation stream; and
  - a matched filter that performs power matching on the demodulated data streams to produce a combined data stream and that subtracts the power supply noise cancellation stream from the combined data stream to remove power supply noise interference from the combined data stream.

17. The apparatus of claim 16, wherein the demodulator circuitry comprises a plurality of window filters, down-sampling circuits, and difference filters, and wherein the power supply noise cancellation circuit comprises a window filter, a down-sampling circuit, and a difference filter.

18. The apparatus of claim 17, wherein the demodulator circuitry comprises at least one in-phase and quadrature signal extraction circuit, and wherein the power supply noise cancellation circuit does not include any in-phase and quadrature signal extraction circuit.

19. The apparatus of claim 18, wherein the data receiver comprises bandpass filter circuitry that produces the bandpass filtered signals, and wherein the bandpass filter circuitry comprises:
- a first bandpass filter that filters signals at a power carrier frequency;
- a second bandpass filter that filters signals at two times the power carrier frequency; and
- a third bandpass filter that filters signals at three times the power carrier frequency.

20. The apparatus of claim 19, wherein the power supply noise cancellation circuit does not include any bandpass filters but includes a baseband filter that outputs signals to the window filter.

* * * * *